United States Patent [19]

DeVries et al.

[11] 4,132,656
[45] Jan. 2, 1979

[54] SOLID PARTICLES CONTAINING LUBRICATING OIL COMPOSITION AND METHOD FOR USING SAME

[75] Inventors: Donald L. DeVries, South Holland; James M. DeJovine, Homewood, both of Ill.

[73] Assignee: Atlantic Richfield Company, Philadelphia, Pa.

[21] Appl. No.: 893,100

[22] Filed: Apr. 3, 1978

Related U.S. Application Data

[63] Continuation-in-part of Ser. No. 752,225, Dec. 20, 1976, Pat. No. 4,094,799.

[51] Int. Cl.$^2$ .................. C10M/1/10; C10M/3/02 C10M 5/02; C10M 7/04;
[52] U.S. Cl. ............................ 252/30; 252/25; 252/29; 252/51.5 A; 252/403
[58] Field of Search ............... 252/25, 29, 30, 51.5 A, 252/403

[56] References Cited

U.S. PATENT DOCUMENTS

| | | | |
|---|---|---|---|
| 3,384,580 | 5/1968 | Peace | 252/29 |
| 3,384,581 | 5/1968 | Peace | 252/30 |
| 3,843,529 | 10/1974 | Bertrand | 252/30 |
| 3,897,353 | 7/1975 | Morduchowitz et al. | 252/51.5 A |
| 3,923,930 | 12/1975 | Waldbillig | 260/878 R |
| 4,036,767 | 7/1977 | Yamamoto et al. | 252/51.5 A |
| 4,039,337 | 8/1977 | Brown et al. | 252/29 |

*Primary Examiner*—Irving Vaughn
*Attorney, Agent, or Firm*—John B. Goodman

[57] ABSTRACT

An improved lubricating oil composition comprising a major amount by weight of oil of lubricating viscosity; a minor amount by weight of solid particles effective to improve the lubricating properties of the composition; and a minor amount by weight of at least one of certain specific polymers has been found to provide improved inhibition of sludge and varnish formation in use. The polymers useful in the present composition comprise (1) an olefin polymer, for example, an ethylene, propylene and 1,4-hexadiene terepolymer, with an dialkylaminoalkyl methacrylate grafted thereon;
(2) an interpolymer prepared from a long chain n alkyl-methacrylate and a dialkylaminoalkylmethacrylate or a N (alkanone) acrylamide; or
(3) mixtures thereof.

23 Claims, No Drawings

SOLID PARTICLES CONTAINING LUBRICATING OIL COMPOSITION AND METHOD FOR USING SAME

CROSS REFERENCE TO RELATED APPLICATION

This application is a continuation-in-part application of application Ser. No. 752,225, filed Dec. 20, 1976 U.S. Pat. No. 4,094,799; the teachings of which are incorporated by reference herein.

BACKGROUND OF THE INVENTION

This invention relates to improved lubricating oil compositions. More particularly, this invention relates to lubricating oil compositions which include solid materials to enhance the properties of such compositions.

Oil compositions are conventionally used to lubricate internal combustion engines, for example, such engines which power motor vehicles. Previous studies have indicated that the inclusion of certain solid materials, e.g., graphite, in these oil compositions improves the engine's fuel efficiency. For example, studies reported in "Stable Colloid Additives for Engine Oils — Potential Improvement in Fuel Economy", James E. Bennington et al, Society of Automotive Engineers, Fuels and Lubricants Meeting, Houston, Texas, June 3–5, 1975, indicate that a gasoline mileage improvement of between 3 to 5 percent is obtained by adding one percent graphite to a conventional lubricating oil composition. Such improvement in fuel economy is particularly valuable in view of, for example, the short supply of such fuels.

However, other criteria must be met by lubricating oil compositions in order to be effective in modern internal combustion engines. For example, such compositions are required to meet certain specifications with regard to tendency to form deposits, e.g., varnish, sludge and the like, on engine components. The presence of the solid lubricants in these compositions tends to increase these deposit forming tendencies. A lubricating oil composition containing at least one of certain solid lubricants and having acceptable deposit forming characteristics is clearly desirable.

Therefore, one object of the present invention is to provide an improved lubricating oil composition.

Another object of this invention is to provide a solid particles-containing lubricating oil composition having reduced deposit forming tendency.

A still further object of the invention is to provide an improved method of lubricating an internal combustion engine. Other objects and advantages of the present invention will become apparent hereinafter.

SUMMARY OF THE INVENTION

An improved lubricating oil composition has now been developed. This composition comprises a major amount by weight of oil of lubricating viscosity; a minor amount by weight of solid particles effective to improve the lubricating properties of the composition; and a minor amount by weight of at least one of certain specific nitrogen-containing polymers.

One preferred nitrogen-containing polymer is a graft polymer having an dialkylaminoalkyl-methacrylate, or mixtures thereof, grafted to the polymer backbone.

A second preferred nitrogen-containing polymer is an oil soluble interpolymer prepared from a long chain n-alkyl methacrylate and a dialkylaminoalkylmethacrylate or a N(alkanone) acrylamide.

DETAILED DESCRIPTION OF THE INVENTION

Preferred nitrogen-containing graft polymers employed in the invention comprise an oil soluble substantially linear terpolymer backbone of ethylene, preferably in an amount of about 15% to about 75% by weight of the polymer, at least one terminally unsaturated straight chain alkene containing from 3 to about 12 carbon atoms, preferably in an amount of about 25% to about 85% of the polymer, and at least one terminally unsaturated non-conjugated diolefin containing 5 to about 8 carbon atoms, preferably in an amount of about 0.10% to about 15% by weight of the polymer; said backbone having an average chain length of about 700 to about 7,000 carbon atoms and having recurringly grafted thereon a polymerized monomer of a dialkylaminoalkyl methacrylate of the formula:

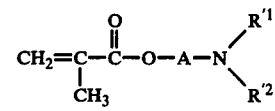

where $R'^1$ and $R'^2$ are alkyl of 1 to 2 carbon atoms and A is a divalent alkylene radical of from 2 to about 4 carbon atoms and (3) mixtures thereof. Preferably, the graft polymer has an inherent viscosity of between about 0.6 and 1.9 as a 0.10 wt.% solution in tetrachloroethylene at 30° C and has a weight ratio of backbone component to said graft component of between about 1000:1 and about 1:10 Preferred nitrogen-containing interpolymers employed in the invention comprise interpolymers prepared from monomers selected from the group consisting of (1) a $C_4$–$C_{22}$ n-alkylmethacrylate, mixtures thereof, and (2) a dialkylaminoalkylmethacrylate or a N(alkanone) acrylamide, said interpolymer having a number average molecular weight of about 30,000 to 120,000.

The incorporation of minor amounts of these nitrogen-containing polymers into the present solid particles-containing compositions has been found to provide a surprising degree of reduction in detrimental deposit formation, e.g., on internal combustion engine components lubricated by the present compositions.

The oils used in the compositions of the present invention are those conventionally used in lubricant manufacture. The suitable lubricating oils include those having a viscosity within the range of about 50 SUS to about 2000 SUS at 100° F. These oils may be refined or otherwise processed to produce an oil having the desired quality. Although mineral oils are preferred, the oil may be synthetic in nature. The oil used in the present invention is preferably a mineral oil having a viscosity of about 100 SUS to about 1000 SUS at 100° F. Combinations of two or more different oils in a single lubricating composition are within the scope of the present invention. The lubricating oil comprises a major proportion, preferably at least about 60 percent still more preferably at least about 70 percent, by weight of the total composition.

The present compositions include a minor amount by weight of solid particles effective to improve the lubricating properties of the compositions. Preferably, a major portion, by weight, and more preferably substantially all, of such solid particles, have a maximum transverse dimension in the range of about 1 millimicron to about 2 microns, and most preferably in the range of about 1 millimicron to about 1 micron. Suitable solid particles for use in the present invention include those materials known to provide improved lubricating properties to lubricating oil compositions. Such solid particles include, for example, graphite, molybdenum disulfide, zinc oxide, tungsten disulfide, mica, boron nitrate, borax silver sulfate, cadmium iodide, lead iodide, barium fluoride, tin sulfide mixtures thereof and the like. The solid particles useful in the present compositions are preferably selected from the group consisting of graphite, molybdenum disulfide, zinc oxide, and mixtures thereof; more preferably from the group consisting of graphite, molybdenum disulfide and mixtures thereof; and most preferably, graphite.

The solid particles are preferably present in the present compositions in an amont of about 0.05% to about 5%, more preferably about 0.1% to about 2%, by weight of the total composition. The solid particles component of the present invention is preferably prepared as a colloidal suspension, in, for example, a conventional lubricating oil and/or at least one conventional lubricating oil detergent. For example, such colloidal suspensions or concentrates may contain about 2% to about 25% or more, by weight of such solid particles.

Any conventional lubricating oil detergent may be used to aid in stabilizing these colloidal suspensions of the presently useful solid particles. Such detergents are often characterized as comprising at least one surface active compound which, when included in a lubricating oil composition tends to inhibit solid contaminants, e.g., combustion by-product present in the engine's lubricating oil, from adhering to metallic surfaces of engine components. Although both ash-containing, metal-based detergents and ashless detergents are useful as such solid particles-containing suspension, the ashless detergents are preferred.

There are many examples of ash-containing, metal-based detergents which are suitable in such solid particles-containing suspension. The ashless detergents preferred for use are compounds which comprise an oil-solubilizing tail and a polar detergent head. Many ashless detergents fitting this general description are known to the art and are commercially available.

Specific examples of this type of ashless detergent include the polyamino-polyalkylene alkenyl succinimides. Amine salts of alkyl phosphoric acids, are also suitable. Polyamine derivatives of long chained hydrocarbons may also be used. Reaction products of alkylene polyamines with long chained alkenyl succinic anhydrides and long chained esters of Mannich bases are suitable detergents. As can be seen, the required polarity may be supplied by groups containing, for example, oxygen, sulfur, phosphorous, nitrogen and mixtures thereof. All of these suitable ashless detergents may be generally characterized as compounds comprising at least one substantially hydrocarbon portion of sufficient size to render the compound oil-soluble and at least one non-metallic polar portion which when attached to the hydrocarbon portion provides a substantial part, often essentially all, of the detergent action.

To illustrate, specific examples of ashless detergents suitable for use as solid particles stabilizers include polyamineopolyalkylene alkenyl succinimines, long chain polyamines, dihydrocarbon substituted polyamines, substituted-phenol substituted polyamine products and mixtures thereof. These compounds may be represented by the following structures:

Polyamine-Polyalkylene Alkenyl Succinimides

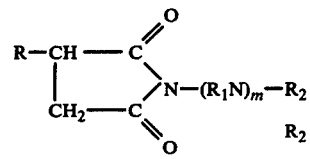

Long Chain Polyamines

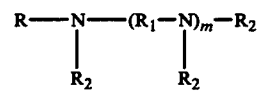

Dihydrocarbon Substituted Polyamines

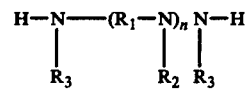

Substituted Phenol-Substituted Polyamine Products

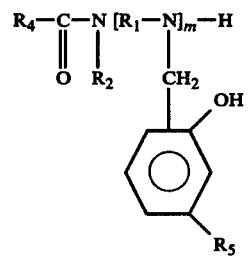

wherein R is a substantially hydrocarbon monovalent radical containing from about 30 to about 250 carbon atoms; each $R_1$ is an independently selected substantially hydrocarbon divalent radical containing from 1 to about 8 carbon atoms; each $R_2$ is independently selected from the group consisting of H and substantially hydrocarbon monovalent radicals containing from 1 to about 8 carbon atoms; each $R_2$ is an independently selected substantially hydrocarbon monovalent radical containing from about 15 to about 100 carbon atoms; $R_4$ is substantially hydrocarbon monovalent radical containing from about 4 to about 30 carbon atoms; m is an integer from 1 to about 10, preferably from 2 to about 10 and n is an integer from zero to about 10, preferably from about 2 to about 6.

It is preferred that R and $R_3$ be alkenyl, preferably selected from the group consisting of polypropenyl and polyisobutenyl. It is preferred that each $R_1$ be an independently selected alkylene radical containing from 1 to about 8, more preferably from 2 to about 6, carbon atoms. Suitable alkylene radicals from which each $R_1$ may be independently selected include methylene, ethylene, propylene, butylene, hexylene, octylene and the like. Although each $R_1$ may be independently selected, it is preferred that for any given ashless detergent all the $R_1$'s contained therein are the same radicals.

The substantially hydrocarbon monovalent radicals from which each $R_2$ may be independently selected each contain from 1 to about 8, preferably from 1 to about 4, carbon atoms. These substantially hydrocarbon radicals include alkyl, such as methyl, ethyl, propyl, butyl, hexyl, oxtyl and the like, alkenyl, such as ethenyl, propenyl, butenyl, hexenyl, octenyl and the like; aryl, alkaryl, aralkyl, alkenaryl and aralkenyl, such as phenyl, methyl phenyl, phenyl ethyl, ethenyl phenyl, phenyl ethenyl and the like.

The substantially hydrocarbon radicals from which $R_4$ is selected contain from 2 to about 30, preferably from about 4 to about 24, carbon atoms. These radicals may be straight chain or branched, saturated or unsaturated, aliphatic (including cycloaliphatic), aromatic or combinations thereof. Examples of suitable radicals s include alkyl such as butyl, octyl, decyl, dodecyl, octadecyl, $C_{24}$ alkyl and the like; alkenyl such as butenyl, octenyl, dodecenyl, octydecenyl, $C_{24}$ alkenyl and the like; and aryl, alkaryl, aralkyl, alkenaryl, aralkenyl such as phenyl, benzyl, naphthyl, ethyl phenyl, decyl phenyl, octadecyl phenyl, phenyl butyl, phenyl decyl, phenyl octadecyl, butenyl phenyl, decenyl phenyl, octadecenyl phenyl, phenyl butenyl, phenyl decenyl, phenyl octadecenyl and the like. More preferably, $R_4$ is selected from the group consisting of alkyl and alkenyl containing from about 10 to about 24 carbon atoms.

Each $R_5$ is preferably independently selected from alkyl radicals containing from 4 to about 30, preferably from about 8 to about 20, carbon atoms. Examples of radicals from which each $R_5$ may be independently selected include amyl, octyl, decyl, octadecyl and the like. The

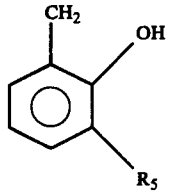

portion of the substituted phenol substituted polyamine acid salts may be replaced by, for example, alkylnaphthols and similar derivatives of biphenyl, terphenyl, phenanthrene, anthracene and the like.

The term "substantially" hydrocarbon radicals referred to herein includes those radicals which are composed primarily of carbon and hydrogen and also includes radicals which contain, in addition, minor amounts of substituents, such as oxygen, halide, sulfur, nitrogen and the like which do not substantially affect the hydrocarbon character of the radicals.

The specific ashless detergents noted above, as well as other of the many suitable ashless detergent materials and methods for preparing these materials are described in the following U.S. Pat. Nos.: 3,237,614; 3,018,247; 3,513,093; 3,753,670; 3,008,993; 3,275,554; 3,473,011; 3,574,576; 3,576,743; 3,578,422; 3,597,174; 3,369,110; 3,652,240; 3,655,351; 3,658,494; 3,658,495; 3,676,089; 3,701,640; 3,711,255; 3,717,447; 3,728,091; 3,746,520; 3,751,255; 3,756,793; 3,762,889; 3,764,281; 3,765,850; 3,773,479; 3,752,657; 3,753,670; 3,779,724 and 3,782,912.

The nitrogen-containing graft polymers useful in the present invention may be prepared using conventional methods well known in the art. For example, one such method involves a two stage procedure.

The first stage comprises contacting an oil soluble substantially linear terpolymer of ethylene, a terminally unsaturated straight chain alkene of 3 to about 12 carbons and a terminally unsaturated non conjugated alkadiene of 5 to about 8 carbons, the terpolymer reactant having an average carbon chain length of about 700 to about 7000 and an inherent viscosity of about 0.6 to about 1.9 at 0.10 wt.% solution in tetrachloroethylene at 30° C with an alkyl lithium of 3 to about 10 carbon atoms in the presence of a liquid alkane, as solvent, of about 5 to about 10 carbon atoms and N,N,N',N' tetralkylalkylene diamine promoter wherein the alkyl and alkylene moieties in the diamine are from 1 to about 4 carbons to form a lithiated terpolymer intermediate. The first stage contacting is preferably conducted under anhydrous conditions (less than 0.01 wt.% water) and in an inert atmosphere, e.g., nitrogen and at a temperature between about 20° and 100° C for a period of between 1 and 25 hours. The first stage contacting preferably involves about 10 to about 200 moles alkyl lithium/100 g. of terpolymer and a mole ratio of alkyl lithium to diamine promoter of about 0.40 to about 2.0.

In the second stage the lithiated hydrocarbon terpolymer intermediate is contacted with a aminoalkyl methacrylate monomer of the formula:

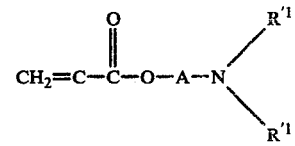

where $R^{1\prime}$ and $R^{2\prime}$ are alkyl of 1 or 2 carbons and A is a divalent alkylene radical of 2 to about 4 carbons, preferably at a temperature between about 100° C. and $-100°$ C under anhydrous conditions and in an inert atmosphere utilizing a weight ratio of lithiated intermediate to total monomer reactant of about 0.2:1 to about 1000:1. The reaction period in the second stage is preferably between about 0.5 and 24 hours.

The graft polymer products is recovered from final reaction mixture by standard means, e.g., adding a lower alkanol having from 1 to 4 carbon atoms in quantities of between about 0.1 and 10 wt.% of the reaction mixture to destroy the alkyl lithium and diamine promoter followed by washing the solution with dilute aqueous mineral acid, (e.g., 5 10 wt.% aq. HCl) and then with water followed, if desired, by further standard purification techniques such as precipitation.

In the first stage of the reaction lithium moieties are randomly placed along the terpolymer chain, the lithiated locations being where the polymethacrylate graft component attaches via replacement of the lithium moieties.

Examples of the alkene component in the terpolymer reactant include propylene, 1-butene, 1-pentene, 1-hexene, 1-heptene, 1-octene, 1-nonene, 1-decene, and 1-dodecene. Suitable alkadiene components in said terpolymer reactant include 1,4-pentadiene, 1,4-hexadiene, 1,5-hexadiene, 2-methyl,1, 5 hexadiene, 1,6-heptadiene and 1,7-octadiene. More preferably, the terpolymer is derived of about 40 to 55 wt.% ethylene, about 40 to 60 wt.% propylene and about 1 to 5 wt.% 1,4-hexadiene and has a carbon atom chain length of about 800 and about 5000. Excellent results are obtained wherein the terpolymer reactant contains 50.5 wt.% ethylene, 46 wt.% propylene and 3.5 wt.% 1,4-hexadiene and has a carbon atom chain length of between about 900 and 2600.

Examples of suitable dialkylaminoalkyl methacrylate monomers, are the N,N-dimethylaminoethyl methacrylate, N,N-diethylaminoethyl methacrylate, N,N-diemethylaminopropyl methacrylate and N,N-diethylaminophopyl methacrylate.

Examples of suitable alkyl lithium are butyl lithium, hexyl lithium, octyl lithium and decyl lithium.

Examples of suitable, N,N,N',N',-tetraalkylalkylenediamines are N,N,N',N',-tetramethylethylene diamine, N,N,N',N'-tetramethylpropylene diamine, N,N,N',N'-tetramethylbutylene diamine, and N,N,N',N'-terrabuthlmethylene diamine.

Examples of suitable inert reaction solvents are hexane, cyclohexane and heptane.

The nitrogen-containing interpolymers suitable for use in the composition of the present invention is an oil soluble interpolymer prepared from a long chain n-alkyl-methacrylate and a dialkylaminoalkylmethacrylate or a N(alkanone) acrylamide. Preferably the interpolymer has a number average molecular weight below about 120,000. These interpolymers are prepared by the complete polymerization of the monomer or mixtures thereof by conventional bulk, solution, or dispersion polymerization methods involving known polymerization catalysts, e.g., azo catalysts, such as azobisisobutronitrile of U.S. Pat. No. 2,471,959 or the well known peroxide catalysts such as benzoyl peroxide and lauryl peroxide, utilized in catalyst quantities of between about 0.1 and 5 wt. percent. Polymerization is normally conducted at a temperature between about 50° and 150° C. preferably at 80°–100° C., and usually carried out in an inert atmosphere such as nitrogen or carbon dioxide to prevent undesirable oxidation. During polymerization, samples are taken periodically for refractive index determation. The polymerization reaction is continued until the refractive index remains relatively steady with the normal reaction time taken between 1 and 10 hours.

The monomers utilized to prepare the useful nitrogen-containing interpolymers include n-alkylmethacrylates and a dialkylaminoalkylmethacrylate or a N(alkanone) acrylamide. The n-alkylmethacrylate monomers are generally selected from those which contain from about 4 to about 22, preferably about 12 to about 18, carbon atoms in the aliphatic hydrocarbon chain. These methacrylates are prepared by standard esterification techniques through the reaction of methacrylic acid with technical grades of long chain primary alcohols. These commercially available alcohols are mixtures of n-alkanols of various chain lengths containing between about 4 and 22 carbons in the alkyl group. Several suitable sources of these alcohols mixtures and the technical grade alcohols sold under the tradename "Neodols" by Shell Chemical Corporation and under the tradename "Alfols" by Continental Oil Company. Typical analysis of two useful alcohols are set forth below:

| | Typical Properties Approx. homolog distribution, wt. % |
|---|---|
| Neodol 25L (Synthetic Lauryl Alcohol) Lighter than $C_{12}OH$ | |
| $C_{12}OH$ | 4 |
| $C_{13}OH$ | 24 |
| $C_{14}OH$ | 24 |
| $C_{15}OH$ | 24 |
| $C_{16}OH$ | 2 |
| Alfol 1620 SP | |

| | Typical Properties Approx. homolog distribution, wt. % |
|---|---|
| (Synthetic stearyl alcohol) | |
| $C_{14}OH$ and lighter | 4 |
| $C_{16}OH$ | 55 |
| $C_{18}OH$ | 27 |
| $C_{20}OH$ | 9 |

One of the nitrogen-containing monomers which can be employed to a suitable nitrogen-containing interpolymer used in this invention is a dialkylaminoalkylmethacrylate. A preferred dialkylaminoalkylmethacrylate is a di$C_1$-$C_6$ alkylamino $C_1$-$C_6$ alkylmethacrylate. Specific examples of these useful methacrylate monomers are diethylaminopropylmethacrylate, dimethylaminoethylmethacrylate, the propylaminoethacrylates and the butylaminobutylmethacrylates. We find that dimethylaminoethymethacrylate is particularly useful.

Another suitable nitrogen-containing monomer is an acrylamide. Preferred acrylamides are N(1,1-dimethylbutan-3-one) acrylamide and N(1,2-dimethyl-1-ethylbutan-3-one) acrylamide.

The compositions of the present invention preferably contain about 0.1% to about 12% by weight (based on the total composition) of at least one of the above-described nitrogen-containing polymers, more preferably, about 3% to about 10% by weight of the total composition. Preferably, the amount by weight of such nitrogen-containing polymers in the composition of this invention is at least equal to the amount of solid particles, e.g., graphite, molybdenum disulfide and the like, present. More preferably, the amount of polymer is at least about 2 times and most preferably at least about 3 times, the amount of solid particles.

The compositions of the present invention possess the advantageous combination of a high degree of effectiveness with respect to lubricity, dispersant-detergent properties, pour-point depressing action and viscosity index improvements. Further, the present compositions provide for improved fuel economy and reduced tendency to form deposits.

In addition to the components already described herein, lubricating compositions contemplated herein can advantageously contain other conventional adjuvants, such as, for example, anti-oxidants, metal deactivators, pour point depressants, oiliness agents, blooming agents, peptizing agents, and the like.

The lubricating compositions of the present invention may be prepared in any conventional manner. For example, the various components may be brought together and blended at a slightly elevated temperature, i.e., about 100° to 130° F., to insure a uniform composition.

In many instances, the additives incorporated into the present lubricating compositions are available as a mixture in a mineral oil or other solvent carrier. Unless otherwise noted, the weight proportions given above refer to the amount of additive material on a carrier or solvent free basis.

The lubricating compositions of the present invention can be used to lubricate internal combustion engines. Maintaining (or causing to be maintained) a lubricating amount of the lubricating compositions of the present invention on the components of such internal combustion engine requiring lubrication, results in obtaining substantial benefits from the present invention.

The following examples illustrate clearly the present invention. However, these examples are not to be interpreted as specific limitations on the invention.

EXAMPLES 1 – 4

The following examples illustrate certain of the outstanding benefits of the present invention.

A series of four lubricating oil compositions were prepared by blending together individual components, noted below, at a slightly elevated temperature, i.e., about 100° F. to about 130° F., to insure proper mixing. The final compositions were as follows:

The Sequence V C Test described in Examples 1 and 2 illustrate the problems in formulating a suitable solids particles-containing lubricating composition. Examples 3 and 4 are lubricating oil composition in accordance with the invention. These lubricating compositions containing graphite and nitrogen-containing graph polymer and nitrogen-containing interpolymers of the invention provide reduced sludge and varnish deposition relative to lubricating compositions not containing these nitrogen-containing polymers, and are illustrative of the improved solids containing lubricating compositions of the invention.

While this invention has been described with respect to various specific examples and embodiments, it is to be understood that the invention is not limited thereto and that it can be variously practiced within the scope of the following claims.

| Component, Wt. % | 1 | 2 | 3 | 4 |
|---|---|---|---|---|
| Mineral Oil, 125 SUS at 100° F. | 84.0 | 74.7 | 75.0 | 75.0 |
| Conventional Additive Mixture[1] | 7.4 | 7.5 | 7.5 | 7.5 |
| Methacrylate Polymer[2] | 8.6 | 7.8 | | |
| Nitrogen-containing graft polymer[3] | — | — | 7.5 | — |
| Nitrogen-containing interpolymer[4] | — | — | — | 7.5 |
| Graphite Dispersion[5] | — | 10.0 | 10.0 | 10.0 |

[1] This mixture is a commercially available combination of materials each of which is conventionally used in lubricating oil compositions. This mixture includes alkyl zinc dithiophosphate, both overbased and neutral calcium sulfonates, calcium phosphonate-phenate and both an ashless dispersant and an ashless rust inhibitor. This mixture also included about 50% by weight of a light mineral oil as solvent for the active ingredients.
[2] A commercially available methacrylate polymer known and conventionally used to improve the viscosity index of lubricating oil polymers. Such polymer includes essentially no N-vinyl pyrrolidone. The material as used includes about 50% by weight of a mineral oil as solvent for the polymer. The polymer is believed to have an average molecular weight of about 800,000 and to be derived from a methacrylic ester containing about 16 carbon atoms per molecule.
[3] A graft polymer prepared in accordance with U.S. Patent 3,923,930 having a terpolymer backbone of ethylene, propylene and 4,4-hexadiene present in a weight ratio of about 50:46:4. This terpolymer has an intrinsic viscosity of about 1.1, about one mole of unsaturation per 2000 grams of terpolymer and about 1500 carbon atoms per terpolymer molecule. N,N-Dimethyaminoethyl methacrylate is grafted on the terpolymer backbone. About 2.67 grams of the methacrylate is employed. The graft polymer contains about 0.04 weight percent of nitrogen.
[4] A series of nitrogen-containing interpolymers having a molecular weight between 30,000 and 120,000 prepared by reacting a mixture of $C_{12}$-$C_{16}$ alkylmethacrylates (Neodol 25L) and $C_{16}$-$C_{20}$ alkylmethacrylates (Alfor 1620 SP) with either dimethyaminoethyl methacrylate or N(1,1 dimethylbutan-3-one) acrylamide in the following proportions:
Monomers, wt. %

| -continued | | | | | | | | |
|---|---|---|---|---|---|---|---|---|
| Dimethylaminoethyl-methacrylate | 4 | — | — | 5 | — | 8 | 10 | — |
| N(1,1 dimethylbutan-3-one)acrylamide | — | 4 | 5 | — | 8 | — | — | 10 |
| $C_{12}$-$C_{16}$ alkylmethacrylate (Neodol 25L) | 71 | 71 | 70 | 70 | 67 | 67 | 70 | 70 |
| $C_{16}$-$C_{20}$ alkylmethacrylate (Alfol 1620SP) | 25 | 25 | 25 | 25 | 25 | 25 | 20 | 20 |

The monomers are combined with 100 grams of a hydrofined paraffin base oil having a viscosity of about 145 SUS at 100° F. and are charged to a one liter resin kettle and purged with purified nitrogen for 40 minutes. The reaction mixture is then heated to 80°-83° C, and 0.5 grams of azobisiosbutronitrile and 0.3 grams of dodecyl mercaptan are added and the polymerization allowed to proceed to completion over a period of four hours. The temperature is then raised to 100° C. and held for one hour at this temperature at which point 300 grams of a hydrofined dewaxed paraffin base oil having a viscosity of about 100 SUS at 100 F. are added and the temperatue is held at 100° C. for an additional hour.
The reactor contents are nitrogen-containing interpolymers dissolved in an oil diluent. The weight amount employed is on a diluent-free basis.
[5] A mineral oil-based dispersion containing about 10% by weight of solid graphite particles which have an average (by weight) particle size of about 200 millimicrons. The dispersion also includes about 6% of a nitrogen and methacrylate-containing dispersant to aid in maintaining dispersion stability. The dispersant is believed to be derived from a methacrylic ester containing about 16 carbon atoms per molecule.

Each of the lubricating oil compositions identified in Examples 1 and 2 was used to lubricate an internal combustion engine which, in turn, was operated through a Reference Sequence V C Test. This test, in which the engine is operated for 192 hours, is described in "Multicylinder Test Sequences for Evaluating Automotive Engine Oils—ASTM Special Technical Publication 315F", American Society for Testing and Materials (1973). This procedure is known to produce data which can be used to make valid comparisons of the effects various lubricating oil compositions have on engine sludge and varnish ratings under normal operating conditions.

Sludge and varnish ratings in the Reference Sequence V C Test are based upon visual inspection of various engine components and comparison with a series of CRC reference standards.

Results of this test using each of the above-described lubricating compositions are summarized below. For comparison purposes, minimum SE standard lubricating oil qualification ratings are also presented.

| REFERENCE SEQUENCE VC RESULTS | COMPOSITION | | SE MINIMUM RATINGS |
|---|---|---|---|
| | 1 | 2 | |
| Average Overall Sludge Rating | 8.7 | 8.1 | 8.5 |
| Average Overall Varnish Rating | 8.3 | 7.8 | 8.0 |
| Piston Skirt | 8.3 | 8.0 | 7.9 |

The above data indicate that compositions which include solid particles cause a substantial decrease in sludge and varnish ratings (increase in sludge and varnish formation). This conclusion is apparent by comparing the results from Composition 2 with those from the non-graphite containing Composition 1. Thus, the inclusion of the conventional viscosity index improver, which provides adequate sludge and varnish formation protection (see Example 1) when included in a composi- The embodiments of the invention in which an exclusive property or privilege is claimed are defined as follows:

1. A composition of matter comprising a major amount by weight of oil of lubricating viscosity; a minor amount by weight of solid particles effective to improve the lubricating properties of said composition; and a minor amount by weight of a nitrogen-containing polymer selected from the group consisting of
   (a) graft polymer having grafted onto an olefin polymer backbone a dialkylaminoalkyl methacrylate;
   (b) an interpolymer of a long chain n-alkyl-methacrylate and a dialkylaminoalkyl methacrylate or a N(alkanone) acrylamide; and
   (c) mixtures thereof;
said nitrogen-containing polymer being present in an amount effective to reduce the deposit forming tendencies of said composition.

2. The composition of claim 1 wherein a major portion of said solid particles have a maximum transverse dimension in the range of about 1 millimicron to about 2 microns.

3. The composition of claim 2 wherein said solid particles are graphite, molybdenum disulfide, zinc oxide or mixtures thereof, said solid particles being present in the amount of about 0.05% to about 5% by weight of the total composition and said nitrogen-containing polymer is present in an amount of about 0.1% to about 12% by weight of the total composition.

4. The composition of claim 2 wherein the nitrogen-containing polymer is said graft polymer having a backbone comprising a terpolymer of ethylene, propylene and 1,4-hexadiene terpolymer.

5. The composition of claim 1 wherein said nitrogen-containing polymer is present in an amount at least about 2 times the amount of said solid particles.

6. The composition of claim 4 wherein the graft polymer comprises an oil soluble substantially linear hydrocarbonaceous polymer backbone of ethylene; at least one terminally saturated straight chain alkene containing from 3 to about 12 carbon atoms; and at least one terminally unsaturated non-conjugated diolefin containing 5 to about 8 carbon atoms, the backbone having an average chain length of about 700 to about 7,000 carbon atoms and having recurringly grafted thereon a monomer of a dialkylaminoalkyl methacrylate of the formula:

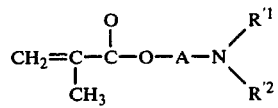

where $R'^1$ and $R'^2$ are alkyl of 1 or 2 carbon atoms and A is a divalent alkylene radical of from 2 to about 4 carbon atoms and (3) mixtures thereof.

7. The composition according to claim 6 wherein about 15% to about 75% by weight of the backbone is ethylene.

8. The composition according to claim 6 wherein about 25% to about 85% by weight of the backbone is said straight chain alkene.

9. The composition according to claim 6 wherein about 0.10% to about 15% by weight of the backbone is said diolefin.

10. The composition according to claim 6 wherein the graft polymer has an inherent viscosity of between about 0.6 and 1.9 as a 0.10 wt. % solution in tetrachloroethylene at 30° C. and has a weight ratio of backbone component to said graft component of between about 1000:1 and about 1:10.

11. The composition according to claim 6 wherein about 15% to about 75% by weight of the backbone is ethylene, about 25% to about 85% by weight of the backbone is said straight chain alkene, and about 0.10 to about 15% by weight of the backbone is said diolefin.

12. The composition of claim 2 wherein the nitrogen-containing polymer is said interpolymer having a number average molecular weight of below about 120,000.

13. The composition of claim 12 wherein the n-alkyl methacrylate monomers contain about 4 to about 22 carbon atoms in the aliphatic chain, and the number average molecular weight is between about 10,000 and 120,000.

14. The composition of claim 13 wherein the n-alkyl methacrylate monomers contain about 12 to about 18 carbon atoms in the aliphatic chain.

15. The composition of claim 14 wherein the dialkylaminoalkyl methacrylate is a di $C_1$-$C_6$ alkylamino $C_1$-$C_6$ alkylmethacrylate.

16. The composition of claim 15 wherein said dialkyl aminomethacrylate is dimethylaminoethylmethacrylate.

17. The composition of claim 12 wherein said acrylamide is a N($C_4$-$C_{12}$ alkanone) acrylamide.

18. The composition of claim 17 wherein said acrylamide is N(1,1 dimethyl-butan-3-one) acrylamide and N(1,2 dimethyl-1-ethyl-butan-3-one) acrylamide.

19. The composition of any one of claims 1 to 18 wherein said solid particles are graphite, molybdenum disulfide or mixtures thereof.

20. The composition of claim 1 wherein said solid particles are present in an amount of about 0.1% to about 2% by weight of the total composition and said nitrogen-containing polymer is present in an amount of about 3% to about 10% by weight of the total composition.

21. The composition of claim 1 wherein said nitrogen-containing polymer is present in an amount of at least about 2.5 times the amount of said solid particles.

22. The composition of claim 1 wherein said nitrogen-containing polymer is present in an amount of said graphite.

23. A method of lubricating an internal combustion engine comprising components requiring lubrication which comprises maintaining a lubricating amount of the composition of claim 1 on components of said engine requiring lubrication.

* * * * *